United States Patent
Yang et al.

(10) Patent No.: US 9,529,539 B1
(45) Date of Patent: Dec. 27, 2016

(54) DATA ALLOCATING APPARATUS, SIGNAL PROCESSING APPARATUS, AND DATA ALLOCATING METHOD

(71) Applicant: Winbond Electronics Corp., Taichung (TW)

(72) Inventors: Chia-Hsiang Yang, Kinmen County (TW); Hao-Min Liu, New Taipei (TW); Yung-Jen Lin, Kaohsiung (TW)

(73) Assignee: Winbond Electronics Corp., Taichung (TW)

( * ) Notice: Subject to any disclaimer, the term of this patent is extended or adjusted under 35 U.S.C. 154(b) by 34 days.

(21) Appl. No.: 14/813,132

(22) Filed: Jul. 30, 2015

(30) Foreign Application Priority Data

Jun. 9, 2015 (CN) .......................... 2015 1 0311660

(51) Int. Cl.
*G06F 3/06* (2006.01)
(52) U.S. Cl.
CPC ........... *G06F 3/0619* (2013.01); *G06F 3/0631* (2013.01); *G06F 3/0665* (2013.01); *G06F 3/0689* (2013.01)
(58) Field of Classification Search
CPC .... G06F 3/0619; G06F 3/0631; G06F 3/0665; G06F 3/0689
See application file for complete search history.

(56) References Cited

U.S. PATENT DOCUMENTS

| 5,935,270 A | 8/1999 | Lin | |
|---|---|---|---|
| 9,317,480 B2* | 4/2016 | Baksheev | G06F 17/142 |
| 2004/0236922 A1* | 11/2004 | Boucher | G06F 9/5016 711/170 |
| 2006/0095492 A1* | 5/2006 | Brown | G06F 17/142 708/404 |
| 2010/0191791 A1* | 7/2010 | Patel | G06F 17/142 708/401 |
| 2012/0041996 A1 | 2/2012 | Ayinala et al. | |
| 2012/0099677 A1* | 4/2012 | Ikegaya | H04L 27/265 375/340 |
| 2012/0102083 A1* | 4/2012 | Miyanaga | H04L 27/263 708/409 |

(Continued)

OTHER PUBLICATIONS

Garrido et al ., "A Pipelined FFT Architecture for Real-Valued Signals," IEEE Transactions on Circuits and Systems I: Regular Papers, Dec. 2009, pp. 2634-2643.

(Continued)

*Primary Examiner* — Edward Dudek, Jr.
(74) *Attorney, Agent, or Firm* — Jianq Chyun IP Office

(57) ABSTRACT

A data allocating apparatus, a signal processing apparatus, and a data allocating method thereof are provided. A plurality of storage units sequentially arranged is provided. A control unit of the data allocating apparatus determines whether the single period output data has the longest storing time in Real-valued Fast Fourier transform (RFFT) output data according to a lifetime analysis, wherein the storing time is a time that the RFFT output data is stored in storage units. The single period output data having the longest storing time is inputted into first storage units of the storage units, and the single period output data not having the longest storing time is inputted into second storage units of the storage units by the control unit. The first storage units are arranged at the last of the storage units, and the second storage units are arranged in front of the first storage units.

10 Claims, 8 Drawing Sheets

(56) References Cited

U.S. PATENT DOCUMENTS

2013/0066932 A1 3/2013 Kwong et al.
2014/0101219 A1* 4/2014 Tang .................. G06F 17/142
                708/403

OTHER PUBLICATIONS

Parhi et al., "Systematic synthesis of DSP data format converters using life-time analysis and forward-backward register allocation," IEEE Transactions on Circuits and Systems II: Analog and Digital Signal Processing, Jul. 1992, pp. 423-440.

\* cited by examiner

DATA ALLOCATING APPARATUS, SIGNAL PROCESSING APPARATUS, AND DATA ALLOCATING METHOD

CROSS-REFERENCE TO RELATED APPLICATION

This application claims the priority benefit of Chinese application serial no. 201510311660.6, filed on Jun. 9, 2015. The entirety of the above-mentioned patent application is hereby incorporated by reference herein and made a part of this specification.

BACKGROUND OF THE INVENTION

Field of the Invention

The invention relates to a data allocating method, and particularly relates to a data allocating apparatus for real-valued fast Fourier transform (RFFT) output data, a signal processing apparatus and a data allocating method.

Description of Related Art

Fast Fourier transform (FFT) has been widely applied in various real-valued signal processing techniques, for example, biomedical signal processing for cochlear implant (CI), hearing aid, epilepsy inhibition, etc. In the aforementioned applications, since the signals are required to be real numbers, a complex fast Fourier transform (CFFT) operation method is used to implement the RFFT. In order to improve operation efficiency and decrease a hardware cost, other specific algorithms such as a pipeline architecture, etc., are further provided to ameliorate the CFFT operation method.

Since calculation of amplitude of the FFT output is generally performed after real part data and corresponding imaginary part data are all generated, when only the real part data or the imaginary part data is generated, such part data is first stored to wait generation of the corresponding imaginary part data or the real part data. In the conventional signal processing apparatus, the number of storage units (for example, registers, buffers, etc.) used for storing the real part data or the imaginary part data is generally designed to be the same with FFT operation points. However, the aforementioned architecture may have a high hardware cost and low operation efficiency.

SUMMARY OF THE INVENTION

The invention is directed to a data allocating apparatus, a signal processing apparatus and a data allocating method, by which reforming efficiency and operation efficiency of output sorting in real-valued fast Fourier transform (RFFT) is improved, and complexity thereof is decreased.

The invention provides a data allocating method, which is adapted to a signal processing apparatus. The method includes following steps. A plurality of sequentially arranged storage units is provided. Single period output data in RFFT output data is obtained. It is determined whether the single period output data has the longest storing time in the RFFT output data according to a lifetime analysis, wherein the storing time is a time that the RFFT output data is stored in the storage units. The single period output data having the longest storing time is input into first storage units of the storage units, wherein the first storage units are arranged at the last of the storage units. The single period output data not having the longest storing time is sequentially input into second storage units of the storage units, wherein the second storage units are arranged in front of the first storage units.

The invention provides a data allocating apparatus including storage units and a control unit. The storage units are sequentially arranged. The control unit is coupled to each of the storage units for respectively transmitting control signals to the storage units to control the storage units. The control unit obtains single period output data in RFFT output data. The control unit determines whether the single period output data has the longest storing time in the RFFT output data according to a lifetime analysis, wherein the storing time is a time that the RFFT output data is stored in the storage units. The control unit inputs the single period output data having the longest storing time into first storage units of the storage units, and sequentially inputs the single period output data not having the longest storing time into second storage units of the storage units. The first storage units are arranged at the last of the storage units, and the second storage units are arranged in front of the first storage units.

The invention provides a signal processing apparatus including a RFFT arithmetic module, storage units and a control unit. The RFFT arithmetic module is configured to output RFFT output data. The storage units are sequentially arranged. The control unit is coupled to each of the storage units for respectively transmitting a control signal to the storage unit to control the storage units. The RFFT arithmetic module outputs single period output data in the RFFT output data. The control unit determines whether the single period output data has the longest storing time in the RFFT output data according to a lifetime analysis, wherein the storing time is a time that the RFFT output data is stored in the storage units. The control unit inputs the single period output data having the longest storing time into first storage units of the storage units, and sequentially inputs the single period output data not having the longest storing time into second storage units of the storage units. The first storage units are arranged at the last of the storage units, and the second storage units are arranged in front of the first storage units.

According to the above descriptions, in the data allocating apparatus, the signal processing apparatus and the data allocating method, it is sequentially determined whether the RFFT output signal is stored for the longest storing time in the storage units according to a lifetime analysis, and the RFFT output signal having the longest storing time is input to the storage units arranged at the last, and the RFFT output signal not having the longest storing time is input to the storage units in front of the last storage units. In this way, the embodiment of the invention provides a control method with lower complexity to implement data allocation of the RFFT output signal, so as to improve the operation efficiency.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In multiple real-valued fast Fourier transform (RFFT) architectures (for example, a two parallel RFFT architecture), not all of output data are simultaneously output during one clock period, so that storage units (for example, registers, buffers, etc.) are used to store a part of the output data output in one clock period. In order to enhance a sorting efficiency of the RFFT output data in the storage units and decrease a complexity of a signal processing apparatus, a storing time of the part of the output data stored in the storage units is determined according to a lifetime analysis, and the part of the output data having the longest storing time is directly input to the storage units arranged at the last, and the other output data is sequentially input to the storage units arranged in front of the last storage units. A plurality of embodiments complied with the spirit of the invention are provided below, though the invention is not limited to the following described content, and those skilled in the art can suitably adjust these embodiments according to an actual requirement.

Figure 1:
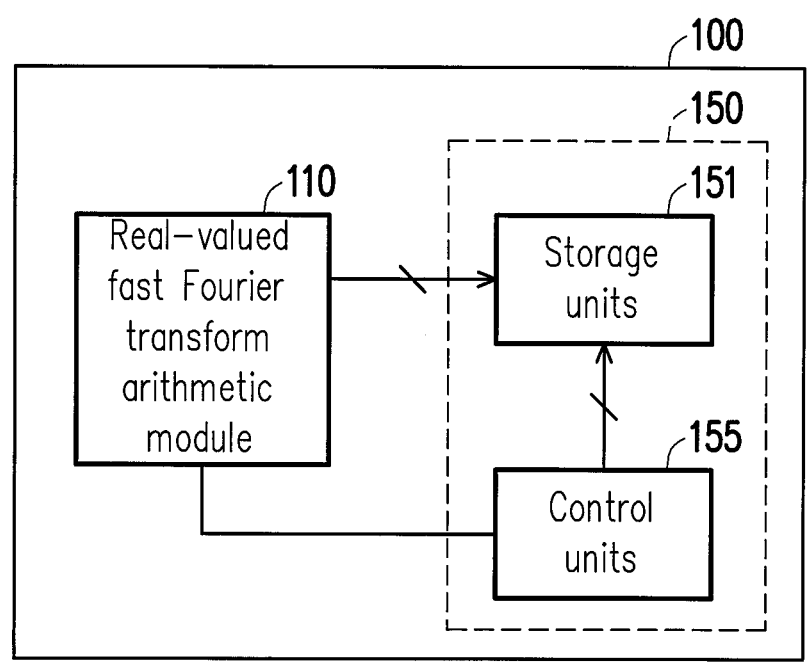
FIG. 1 is a circuit block diagram of a signal processing apparatus according to an embodiment of the invention.

FIG. 1 is a circuit block diagram of a signal processing apparatus according to an embodiment of the invention. Referring to FIG. 1, the signal processing apparatus 100 includes an RFFT arithmetic module 110 and a data allocating apparatus 150. The signal processing apparatus 100 can be applied to electronic apparatus such as a cochlear implant (CI), an electroencephalogram (EEG) monitoring device, a nerve signal analyser, etc., which is not limited by the invention.

According to different design requirements, the RFFT arithmetic module 110 may include (but not limited thereto) hardware devices, modules or units such as a processing unit (for example, a central processor, a microprocessor, etc.), storage units (for example, registers, buffers, etc.), an adder, a multiplexer, a multiplier, etc. In the present embodiment, the RFFT arithmetic module 110 is used for output RFFT output data (or RFFT output values).

Figure 2A:
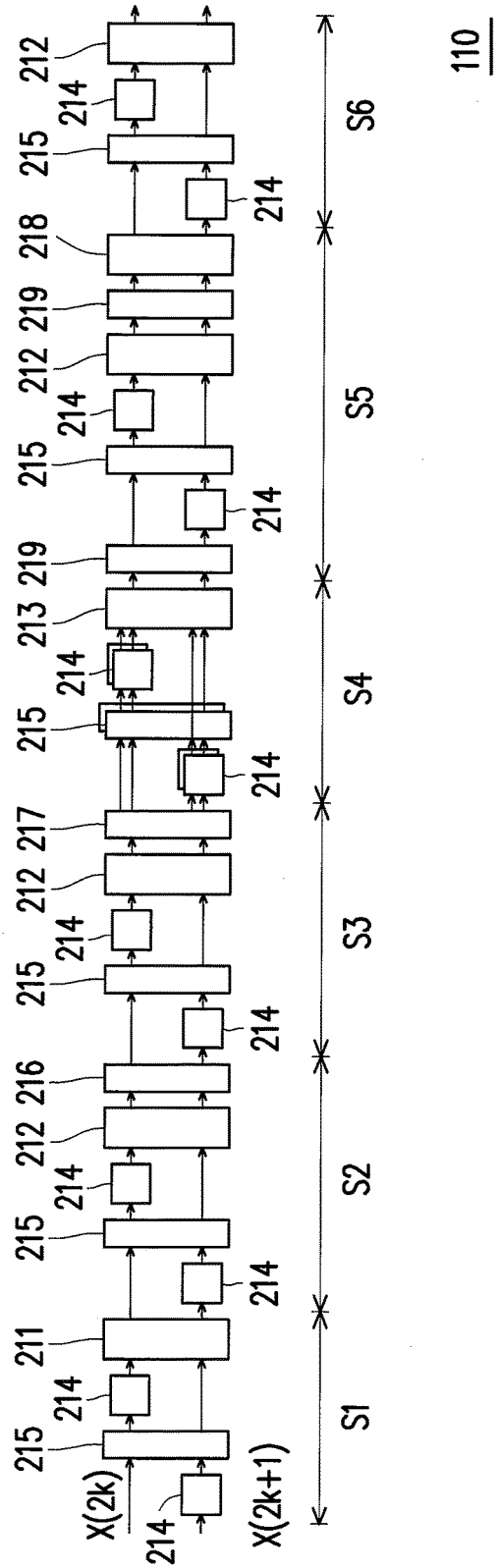
FIG. 2A-FIG. 2F are examples of architectures of an arithmetic module.
Figure 2B:
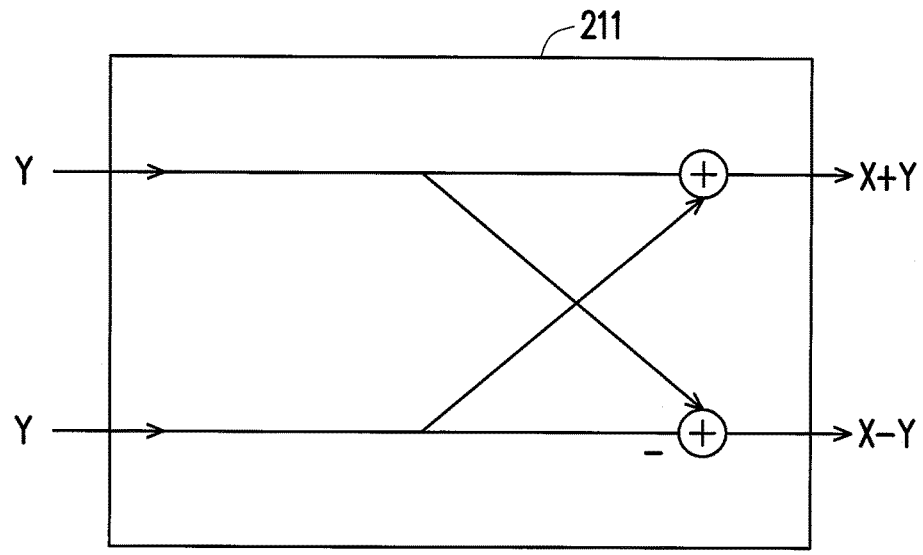
Figure 2C:
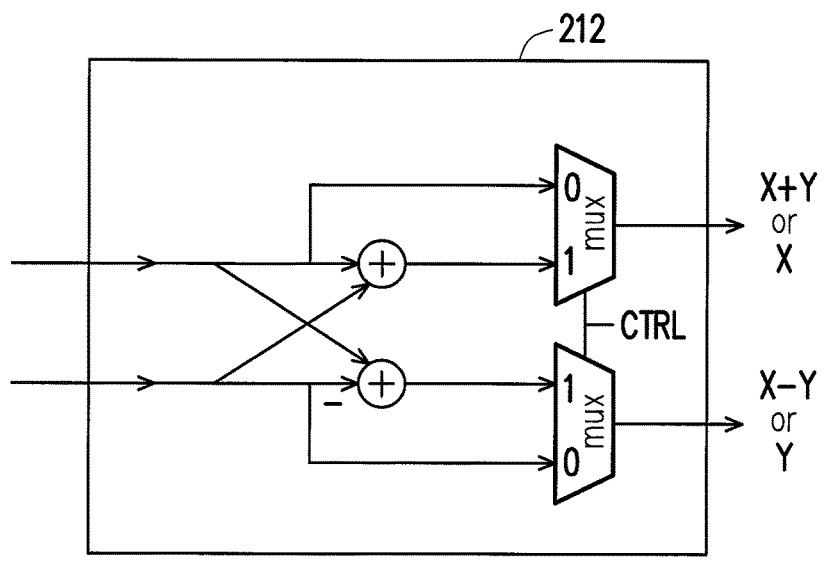
Figure 2D:
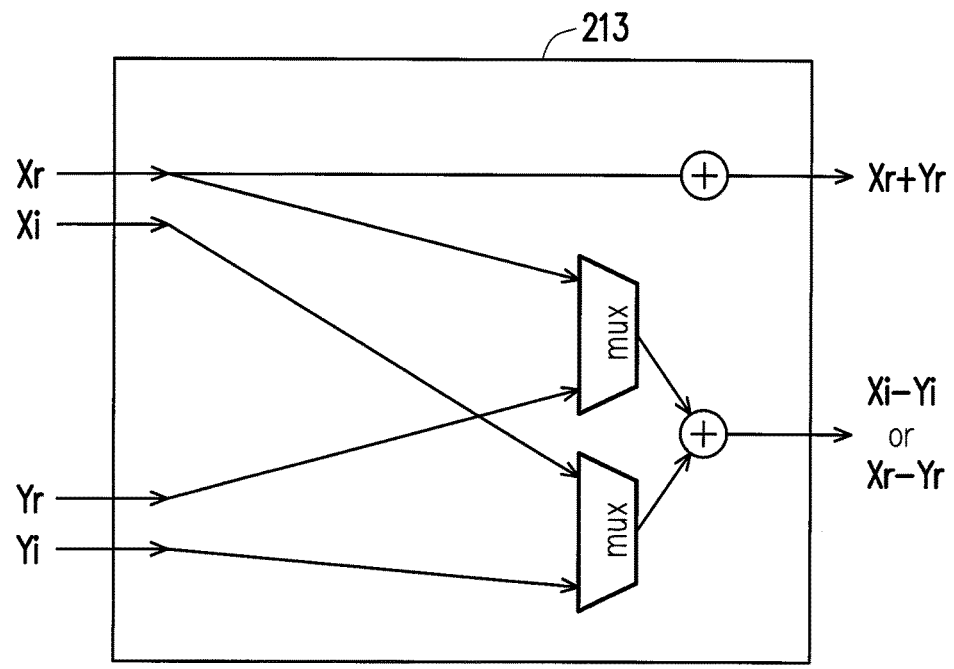
Figure 2E:
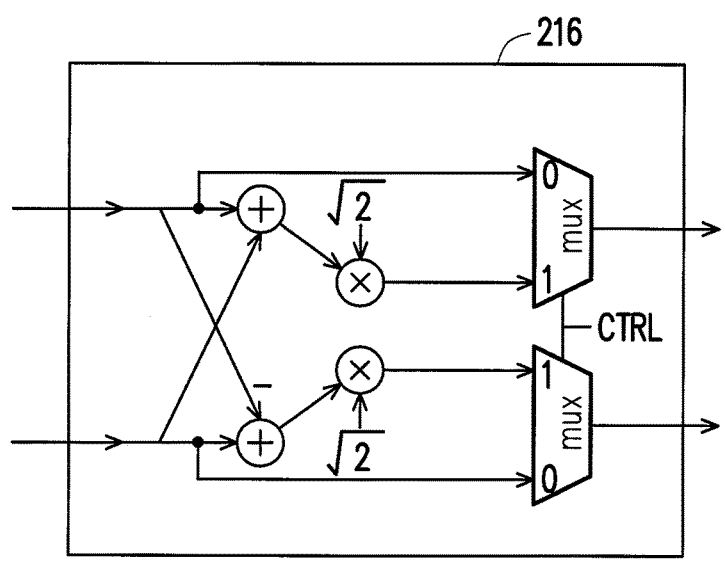
Figure 2F:
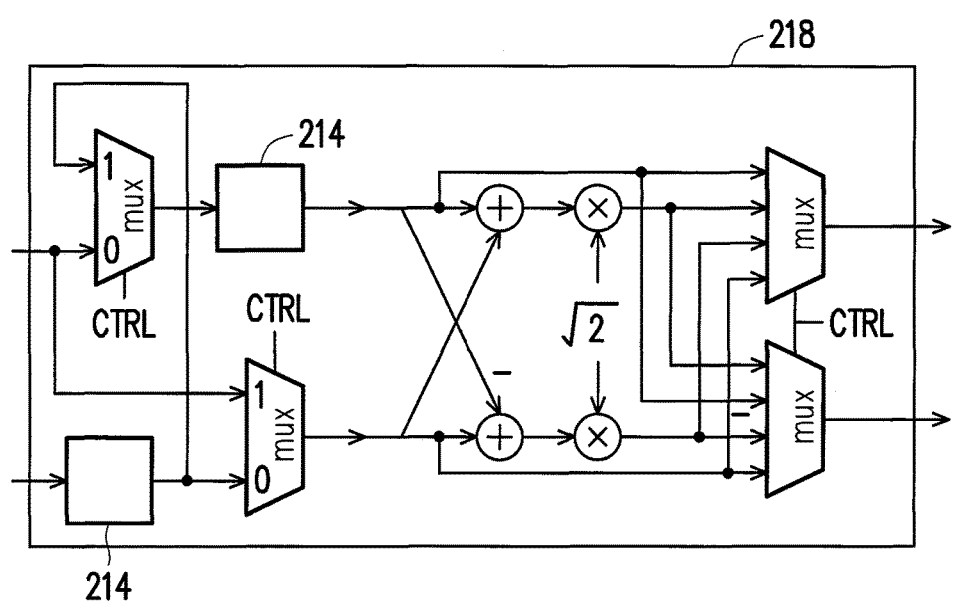

For example, FIG. 2A-FIG. 2F are examples of architectures of the RFFT arithmetic module 110 used for generating the RFFT output data provided by literature [1] (literature [1]: M. Garrido, K. K. Parhi and J. Grajal, "A pipeline FFT architecture for Real-Valued Signals," IEEE Trans. Circuits Syst.-I Reg. Papers, Vol. 56, No. 12, December 2009). Referring to FIG. 2A, the RFFT arithmetic module 110 may include butterfly arithmetic modules 211, 212, 213, timing delay units 214, switch units 215, multipliers 216, 217 and 218, and a displacer 219. An input signal (i.e. X(k), where k is an integer) is input to the RFFT arithmetic module 110, and after arithmetic of several arithmetic stages S1-S6 in the RFFT arithmetic module 110, the RFFT output data is sequentially output. Referring to FIG. 2A-FIG. 2D, the butterfly arithmetic modules 211, 212 and 213 in different arithmetic stages (for example, S1-S6) can be respectively composed of one or more adders (indicated by "⊕" in the figures) and one or more multiplexers MUX. Referring to FIG. 2A, FIG. 2E and FIG. 2F, the multipliers 216 and 218 are also respectively be composed of one or more adders (indicated by "⊕" in the figures), one or more multiplexers MUX and one or more multiplication units and a processing unit (not shown) is adopted to transmit a control signal CTRL to control the multiplexers MUX.

It should be noted that FIG. 2A-FIG. 2F only illustrate an implantation (two parallel RFFT architecture) of the RFFT arithmetic module 110, and those skilled in the art can adjust the architecture according to an actual design requirement (for example, four or eight parallel architecture, or radix 2, 4 or 16 architecture, etc.), which is not limited by the invention. Moreover, in some other embodiments, the RFFT arithmetic module 110 may only include the processing unit and the storage units, and the processing unit can load software (or firmware) programs and the RFFT input value/signal from the storage units, and execute arithmetic procedures of all of or a part of the hardware devices in FIG. 2A (for example, the butterfly arithmetic modules 211, 212 and 213, and the timing delay units 214, etc.) in a programming manner.

The data allocating apparatus 150 includes one or a plurality of storage units 151 and a control unit 155. The storage unit 151 can be any type of a fixed or movable random access memory (RAM), a flash memory or a register, a buffer, a latch, etc. of a similar device. In the embodiment of the invention, the storage units 151 are sequentially arranged. For example, a plurality of the storage units 151 connected in parallel or series may construct various types of circuit such as a buffer circuit, a delay circuit.

In the present embodiment, the number of the storage units 151 is determined by analyzing all of the RFFT output data output by the RFFT arithmetic module 110 according to a lifetime analysis. The method of calculating the minimum number of the storage units 151 according to the lifetime analysis may refer to related description of a literature [2] (K. K. Parhi, "Systematic synthesis of DSP data format converters using life-time analysis and forward-backward register allocation," IEEE Trans. Circuits Syst. II, Express Briefs, vol. 39, no. 7, pp. 423-440, July 1992). For example, the minimum number of the storage units 151 can be represented by an equation (1):

$$\underset{l}{\mathrm{Max}}[I(T_{lat}+l)-O(T_{lat}+l)] \quad (1)$$

Where, I(n) and O(n) respectively represent a number of variable inputs and outputs in case that a time unit is n, $T_{lat}$ is a latency of a converter, and l represents a clock period.

Figure 3:
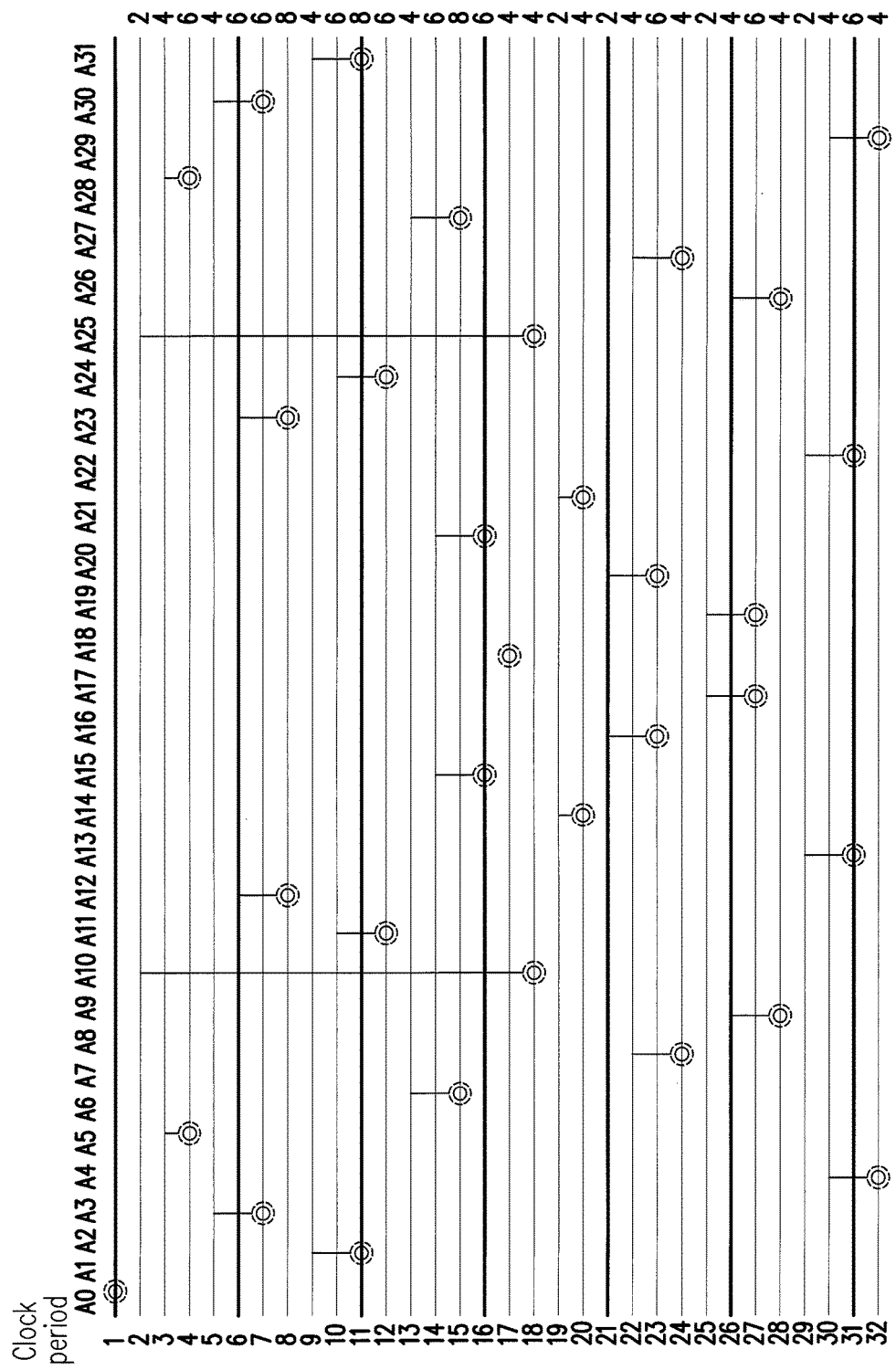
FIG. 3 is a lifetime table of the architecture of FIG. 2A.

For example, FIG. 3 is a lifetime table of the architecture of FIG. 2A. Referring to FIG. 3, it is assumed that arithmetic points are 64 (i.e. 64-point RFFT). Under the two parallel RFFT architecture of FIG. 2A, the amount of single period output data output during each clock period is 2. A0 to A31 represent output of 32 data samples of the RFFT (i.e. the RFFT output data), where black dot represents real part data, and dashed round frame represents the corresponding imaginary part data. Each of the data samples (the real part data or the imaginary part data) is probably generated (i.e. the RFFT operation unit 110 outputs such data sample) in the same or different clock periods, and it has to wait for generation of the corresponding imaginary part data or the real part data before outputting this set of data (i.e. the real part data and the corresponding imaginary part data) to perform subsequent operation. A time interval for each of the data samples is generated by the RFFT operation unit 110 till a final output thereof is referred to as a "live" storing time.

By referring to the number of the clock periods in a left column of the lifetime table, the clock periods corresponding to generation and output of each data sample are known. For example, the real part data of the data sample A1 is generated in the 9$^{th}$ clock period, and since the corresponding imaginary part data is generated in the 11$^{th}$ clock period, the real part data and the corresponding imaginary part data of the data sample A1 are simultaneously output in the 12$^{th}$ clock period. On the other hand, a right column in the lifetime table represents the number of the storage units 151 required in each clock period. For example, in the 11$^{th}$ clock period, 6 storage units 151 are required. There are the maximum "live" data samples (i.e. 8) in the 6$^{th}$, 10$^{th}$, 14$^{th}$ clock periods. Therefore, the architecture of FIG. 2A at least requires 8 storage units 151 under the condition that the arithmetic points are 64 (it is assumed that one storage unit 151 stores one data sample).

It should be noted that according to different design architectures of the RFFT arithmetic module 110 and different arithmetic points, the minimum number of the storage units 151 required by the data allocating apparatus 150 can be different in different embodiments, though the invention is not limited thereto.

In the embodiment of the invention, according to different coupling methods, the storage units 151 can be divided into first storage units and second storage units. The first storage units are arranged at the last of the storage units 151, and the second storage units are arranged in front of the first storage units.

In an embodiment, an i$^{th}$ second storage unit is coupled to an (i+N)$^{th}$ second storage unit, where N is the number of the single period output data, and i is between 1 and a quotient obtained by dividing the number of the second storage units by N. For example, the number N of the single period output data is 4 and the number of the second storage units is 12, i is then between 1 and 3, where the first second storage unit is coupled to the fifth second storage unit, and the others are deduced by analogy.

It should be noted that the single period output data is a part RFFT output data output by the RFFT arithmetic module 110 during each clock period (of the processing unit thereof). The number N of the single period output data is a positive integer greater than 0 (for example, 2, 3, 4, etc.). According to different design architectures of the RFFT arithmetic module 110, the number N of the single period output data is probably different, though the invention is not limited thereto.

Figure 4:
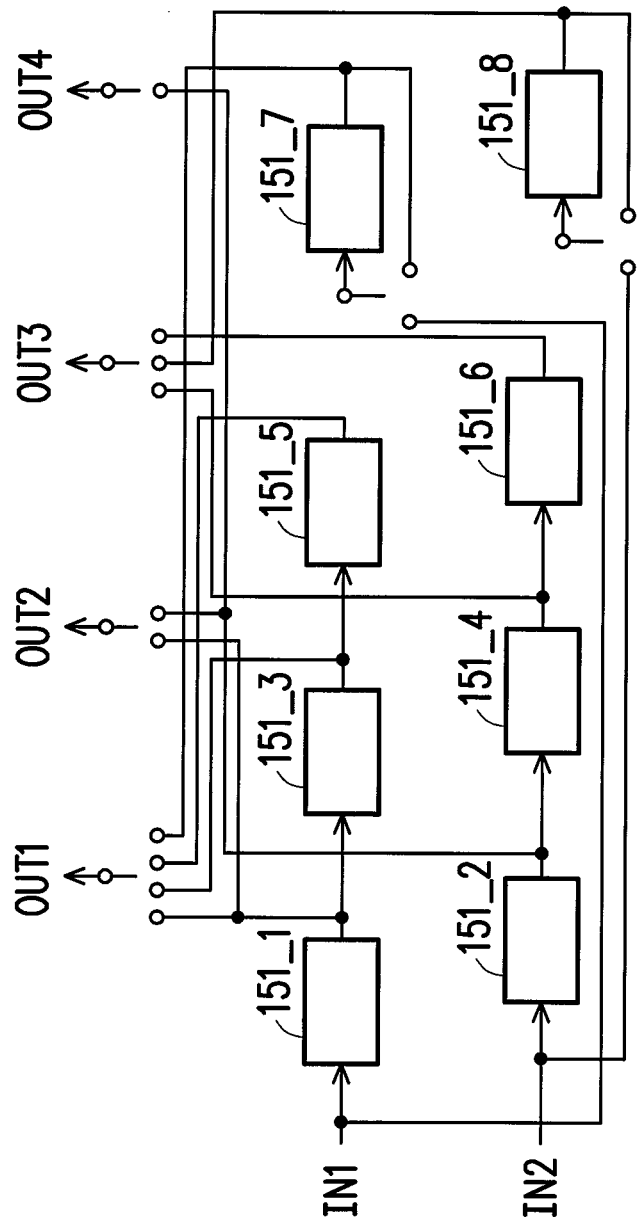
FIG. 4 is a circuit block diagram illustrating an example of storage units.

For example, FIG. 4 is a circuit block diagram illustrating an example of the storage units 151. Referring to FIG. 4, the number (i.e. 8) of the storage units 151 is determined according to lifetime analysis based on the architecture of FIG. 2A and the condition that the arithmetic points are 64. According to different coupling methods, the storage units 151 can be divided into the first storage units 151_7, 151_8 and the second storage units 151_1-151_6. The first storage units 151_7 and 151_8 are arranged behind the second storage units 151_1-151_6. It is assumed that the amount of the single period output data output by the RFFT arithmetic module 110 of FIG. 2A in every clock period is 2, two output terminals of the RFFT arithmetic module 110 are respectively connected to input terminals of the second storage units 151_1 and 151_2, and can be selectively connected to input terminals of the first storage units 151_7 and 151_8 according to the control signal transmitted by the control unit 155 (or through a switch unit, etc.). The 1$^{st}$ second storage unit 151_1 is coupled to the 3$^{rd}$ second storage unit 151_3, and the 3$^{rd}$ second storage unit 151_3 is coupled to the 5$^{th}$ second storage unit 151_5, and the others are deduced by analogy. Output terminals of the first storage units 151_7 and 151_8 and the second storage units 151_1-151_6 can be selectively connected to output terminals OUT1-OUT4 of the data allocating apparatus 150 according to the control signal (or through the switch unit, etc.).

The control unit 155 can be a CPU, a microprocessor, a micro controller, a system on chip (SoC) or processing unit of the other similar devices, and the control unit 155 respectively transmit a control signal (for example, a clock signal, a switch switching signal, a selection signal, etc.) to each of the storage units 151 (for example, the first storage units 151_7, 151_8 and the second storage units 151_1-151_6 in FIG. 4) for controlling the storage units 151. For example, the storage units 151 is a shift register, and the control unit 155 transmits a control signal of a clock signal to the storage units 151, and the storage units 151 receiving the clock signal outputs the RFFT output data stored therein to another storage units 151 coupled thereto.

It should be noted that according to different design requirements, the control unit 155 can be coupled to the RFFT arithmetic module 110, and the RFFT arithmetic module 110 can transmit the clock signal related to the clock period, such that the RFFT arithmetic module 110 and the control unit 155 can synchronously operate.

Figure 5:
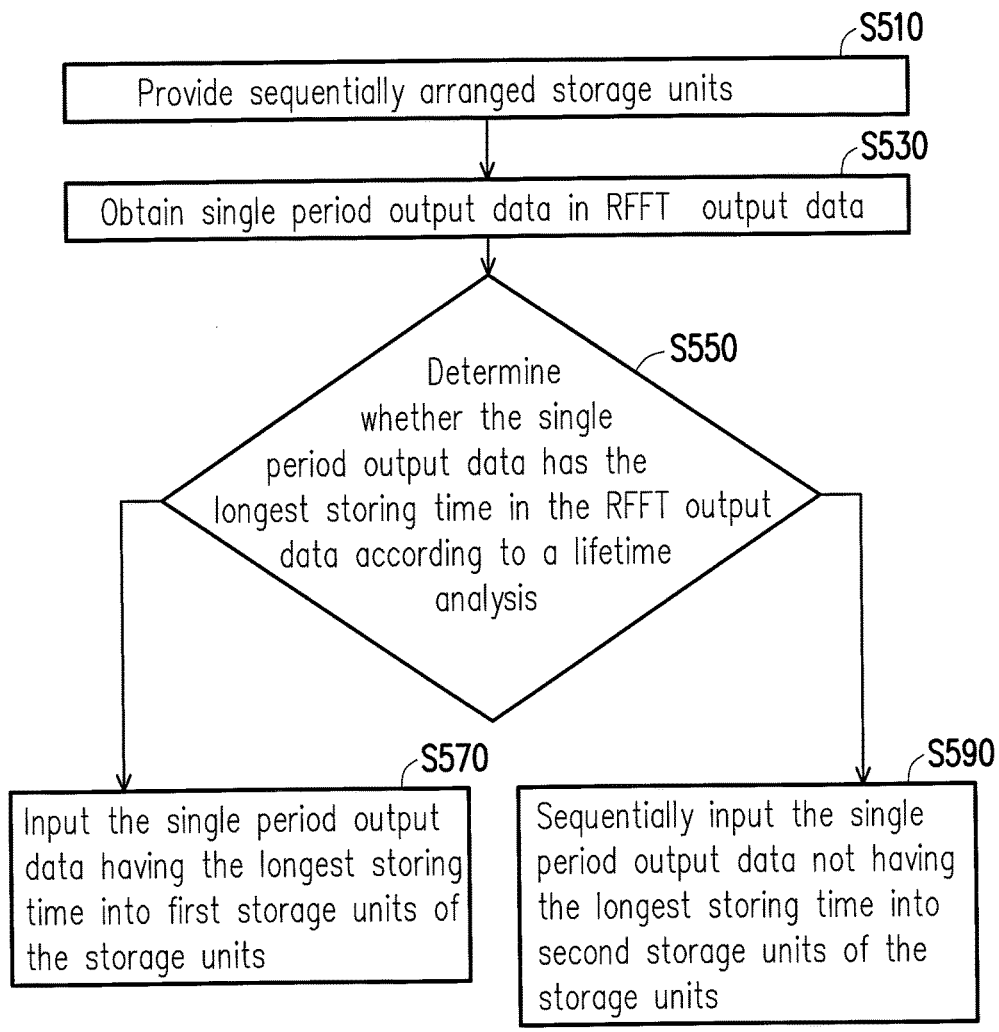
FIG. 5 is a flowchart illustrating a data allocating method according to an embodiment of the invention.

To facilitate understanding of the operation of the embodiment of the invention, an embodiment is provided below to describe an operation flow. FIG. 5 is a flowchart illustrating a data allocating method according to an embodiment of the invention. Referring to FIG. 5, the data allocating method of the embodiment is adapted to the signal processing apparatus 100 of FIG. 1. The data allocating method of the embodiment is described below with reference of various components of the signal processing apparatus 100. The steps of the method flow can be adjusted according to an actual application, and are not limited by the invention.

In step S510, the signal processing apparatus 100 provides the sequentially arranged storage units 151 according to the lifetime analysis. Arrangement of the storage units 151 may refer to the storage units 151 of FIG. 1, the lifetime table of FIG. 3 and related descriptions of the circuit in FIG. 4, and details thereof are not repeated. It should be noted that in order to decrease a hardware cost and enhance the operation efficiency, in the embodiment of the invention, the minimum number of the required storage units 151 is determined according to the lifetime analysis (i.e. the minimum number of the storage units 151 required by the signal processing apparatus 100 for storing the RFFT output data in all of the clock periods).

In step S530, the data allocating apparatus 150 obtains the single period output data in the RFFT output data from the RFFT arithmetic module 110. Taking FIG. 2A as an example, the RFFT arithmetic module 110 outputs two batches of the single period output data, and, the data allocating device 150 can obtain the two batches of the single period output data in every clock period.

In step S550, the control unit 155 determines whether the single period output data has the longest storing time in the RFFT output data according to the lifetime analysis, wherein the storing time is a time that the RFFT output data is stored in the storage units 151. Taking FIG. 3 as an example, it has to wait for 8 clock periods before the corresponding imaginary part data of the real part data R8, R24 of the RFFT output data A8, A24 is generated. Namely, the storing time that the real part data R8, R24 of the RFFT output data A8, A24 are required to be stored in the storage units 151 is 8. The real part data R8, R24 of the RFFT output data A8, A24 have the longest storing time in all of the RFFT output data A0-A31.

Then, the control unit 155 may for example record the longest storing time and the corresponding RFFT output data, and determine whether the obtained single period output data is the recorded RFFT output data. Alternatively, for example, generation time (or output time of the RFFT arithmetic module 110) of all of the RFFT output data are learned according to the lifetime analysis of FIG. 3, and the control unit 155 can record the clock periods corresponding to generation of the RFFT output data having the longest storing time in advance, and when the clock periods are reached, the control unit 155 determines that the storing time of the generated RFFT output data is the longest. Alternatively, the RFFT arithmetic module 110 may for example directly transmit a control signal related to the storing time to the control unit 155, and the control unit 155 accordingly determines whether the single period output data has the longest storing time.

In step S570, if the single period output data obtained by the data allocating apparatus 150 in the current clock period has the longest storing time, the control unit 150 outputs the single period output data having the longest storing time to the first storage units in the storage units 151. For example, the control unit 155 respectively outputs the single period output data having the longest storing time to the first storage units 151_7 and 151_8 shown in FIG. 4.

On the other hand, in step S590, if the single period output data obtained by the data allocating apparatus 150 in the current clock period does not have the longest storing time, the control unit 150 sequentially outputs the single period output data not having the longest storing time to the second storage units in the storage units 151 (for example, the second storage units 151_1 and 151_2 shown in FIG. 4).

In an embodiment, the control unit 155 outputs one of the RFFT output data in the $i^{th}$ second storage unit RFFT in the second storage units to the $(i+N)^{th}$ second storage unit, and respectively inputs the obtained single period output data (not having the longest storing time) to the $1^{st}$ second storage unit to the $N^{th}$ second storage unit. For example, taking FIG. 4 as an example, the number N of the single period output data is 2. If other RFFT output data is already existed in the second storage units 151_1 and 151_2, the control unit 155 first inputs the RFFT output data in the $1^{st}$ second storage unit 151_1 to the $3^{rd}$ second storage unit 151_3, and inputs the RFFT output data in the $2^{nd}$ second storage unit 151_2 to the $4^{th}$ second storage unit 151_4. Then, the control unit 155 respectively inputs the obtained single period output data to the 1st second storage unit 151_1 and the $2^{nd}$ second storage unit 151_2.

Moreover, the control unit 155 determines whether a set of complex data is existed in the storage units 151, where the set of complex data includes one of a plurality of real part data and one of a plurality of corresponding imaginary part data in the RFFT output data, and outputs the set of complex data from the storage units 151. Taking FIG. 4 as an example, it is assumed that the real part data R15 of the RFFT output data A15 is stored in the first storage unit 151_7, and the imaginary part data I15 of the RFFT output data A15 is stored in the second storage unit 151_1, the control unit 155 takes the real part data R15 and the imaginary part data I15 of the RFFT output data A15 as one set of complex data, and outputs the set of complex data (i.e. the real part data R15 and the imaginary part data I15) through the output terminals OUT1 and OUT2 of the data allocating apparatus 150.

If the RFFT output data in the first storage units is not such set of complex data, the control unit 155 continually stores the RFFT output data of the first storage units in the first storage units. Taking FIG. 4 as an example, it is assumed that the real part data of the RFFT output data A24 is stored in the first storage unit 151_7, though the output data obtained during the current clock period is not the imaginary part data of the RFFT output data A24, the control unit 155 continually stores the real part data of the RFFT output data A24 in the first storage unit 151_7.

To facilitate those skilled in the art understanding the embodiments of the invention, another example is provided below for description. Table (1) is an example of data allocation. Referring to the table (1), FIG. 3 and FIG. 4, the table (1) is a data allocation table of the architecture of FIG. 2 in case that the operation points are 64. In the $1^{st}$ clock period, the data allocating apparatus 150 obtains the real part data R8 of the RFFT output data A8 and the real part data R24 of the RFFT output data A24 from the RFFT arithmetic module 110. According to the lifetime table of FIG. 3, the real part data R8, R24 of the RFFT output data A8, A24 have the longest storing time (i.e. 8 clock periods), so that the control unit 155 respectively inputs the real part data R8 of the RFFT output data A8 and the real part data R24 of the RFFT output data A24 into the first storage unit 151_7 and the first storage unit 151_8 of FIG. 4.

TABLE 1

| Clock period | Input | Second storage unit 151_1 | Second storage unit 151_2 | Second storage unit 151_3 | Second storage unit 151_4 | Second storage unit 151_5 | Second storage unit 151_6 | First storage unit 151_7 | First storage unit 151_8 | Output |
|---|---|---|---|---|---|---|---|---|---|---|
| 0 | R0 | | | | | | | | | |
| 1 | R8/R24 | R0 | | | | | | | | R0 |
| 2 | R4/R28 | | | | | | | R8 | R24 | |
| 3 | I4/I28 | R4 | R28 | | | | | R8 | R24 | |
| 4 | R2/R30 | I4 | I28 | R4 | R28 | | | R8 | R24 | A4/A28 |
| 5 | R10/R22 | R2 | R30 | | | | | R8 | R24 | |
| 6 | I2/I30 | R10 | R22 | R2 | R30 | | | R8 | R24 | |
| 7 | I10/I22 | I2 | I30 | R10 | R22 | R2 | R30 | R8 | R24 | A2/A30 |
| 8 | R1/R31 | I10 | I22 | | | R10 | R22 | R8 | R24 | A10/A22 |
| ... | ... | ... | ... | ... | ... | ... | ... | ... | ... | ... |

On the other hand, in the $2^{nd}$ clock period, the data allocating apparatus 150 obtains the real part data R4 of the RFFT output data A4 and the real part data R28 of the RFFT output data A28. According to the lifetime table of FIG. 3, the real part data R4, R28 of the RFFT output data A4, A28 do not have the longest storing time, so that the control unit 155 respectively inputs the real part data R4 of the RFFT output data A4 and the real part data R28 of the RFFT output data A28 into the second storage unit 151_1 and the second storage unit 151_2 of FIG. 4. In the $4^{th}$ clock period, since the imaginary part data I4, I28 of the RFFT output data A4, A28 do not have the longest storing time, the control unit 155 respectively inputs the real part data R4 of the RFFT output data A4 and the real part data R28 of the RFFT output data A28 into the second storage unit 151_3 and the second storage unit 151_4 in FIG. 4, and respectively inputs the imaginary part data I4 of the RFFT output data A4 and the imaginary part data I28 of the RFFT output data A28 into the second storage unit 151_1 and the second storage unit 151_2 in FIG. 4.

Moreover, in the $4^{th}$ clock period, since the storage units 151 store two sets of complex data (i.e. the real part data R4 and the imaginary part data I4 of the RFFT output data A4, and the real part data R28 and the imaginary part data I28 of the RFFT output data A28), the control unit 155 can outputs these two sets of complex data. It should be noted that input, output and shifting methods of the other RFFT output data can be deduced by analogy, and details thereof are not repeated.

In summary, in the data allocating apparatus, the signal processing apparatus and the data allocating method of the invention, the architecture with the minimum number of the storage units is provided according to the lifetime analysis, and the RFFT output data having the longest storing time is directly input to the stored units arranged at the last, and the RFFT output data not having the longest storing time is sequentially input to the storage units arranged in the front. In this way, the embodiments of the invention are adapted to a plurality of biomedical platforms having a real-valued output demand, and provide an implementation means with low complexity and high hardware operation efficiency, so as to effectively decrease the hardware cost and shorten the operation time. Moreover, compared with the forward-backward register allocation method of the literature [2], the embodiments of the invention can further decrease power consumption and hardware area. In addition, the output sorting of the embodiments of the invention has a fixed property, which is easy to be implemented.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data allocating method, adapted to a signal processing apparatus, the data allocating method comprising:
   providing a plurality of sequentially arranged storage units;
   obtaining a plurality of single period output data in a plurality of real-valued fast Fourier transform (RFFT) output data;
   determining whether the single period output data has the longest storing time in the RFFT output data according to a lifetime analysis, wherein the storing time is a time that the RFFT output data is stored in the storage units;
   inputting the single period output data having the longest storing time into a plurality of first storage units of the storage units, wherein the first storage units are arranged at the last of the storage units; and
   sequentially inputting the single period output data not having the longest storing time into a plurality of second storage units of the storage units, wherein the second storage units are arranged in front of the first storage units.

2. The data allocating method as claimed in claim 1, wherein the step of sequentially inputting the single period output data not having the longest storing time into the second storage units of the storage units comprises:
   outputting one of the RFFT output data in an $i^{th}$ second storage unit of the second storage units to an $(i+N)^{th}$ second storage unit, wherein the $(i+N)^{th}$ second storage unit is coupled to the $i^{th}$ second storage unit, N is the number of the single period output data, and i is between 1 and a quotient obtained by dividing the number of the second storage units by N; and
   respectively inputting the obtained single period output data into a $1^{st}$ second storage unit to an $N^{th}$ second storage unit.

3. The data allocating method as claimed in claim 1, further comprising:
   determining whether a set of complex data is existed in the storage units, wherein the set of complex data comprises one of a plurality of real part data and one of a plurality of corresponding imaginary part data of the RFFT output data; and
   outputting the set of complex data from the storage units.

4. The data allocating method as claimed in claim 3, wherein after the step of inputting the single period output data into the first storage units of the storage units, the data allocating method further comprises:
   continually storing the RFFT output data of the first storage unit in the first storage unit if the RFFT output data in the first storage unit is not the set of complex data.

5. A data allocating apparatus, comprising:
   a plurality of storage units, wherein the storage units are sequentially arranged; and
   a control unit, coupled to each of the storage units, and respectively transmitting a plurality of control signals to the storage units to control the storage units,
   wherein the control unit obtains a plurality of single period output data in a plurality of RFFT output data, and determines whether the single period output data in the RFFT output data has the longest storing time in the RFFT output data according to a lifetime analysis, wherein the storing time is a time that the RFFT output data is stored in the storage units, and the control unit inputs the single period output data having the longest storing time into a plurality of first storage units of the storage units, and sequentially inputs the single period output data not having the longest storing time into a plurality of second storage units of the storage units, wherein the first storage units are arranged at the last of the storage units, and the second storage units are arranged in front of the first storage units.

6. The data allocating apparatus as claimed in claim 5, wherein an $i^{th}$ second storage unit is coupled to an $(i+N)^{th}$ second storage unit, N is the number of the single period output data, and i is between 1 and a quotient obtained by dividing the number of the second storage units by N, and the control unit outputs one of the RFFT output data in the $i^{th}$ second storage unit in the second storage units to the $(i+N)^{th}$ second storage unit, and respectively inputs the obtained single period output data into a $1^{st}$ second storage unit to an $N^{th}$ second storage unit.

7. The data allocating apparatus as claimed in claim 5, wherein the control unit determines whether a set of complex data is existed in the storage units, wherein the set of complex data comprises one of a plurality of real part data and one of a plurality of corresponding imaginary part data of the RFFT output data, and outputs the set of complex data from the storage units.

8. The data allocating apparatus as claimed in claim 7, wherein if the RFFT output data in the first storage unit is not the set of complex data, the control unit continually stores the RFFT output data of the first storage unit in the first storage unit.

9. A signal processing apparatus, comprising:
   a RFFT arithmetic module, configured to output a plurality of RFFT output data;
   a plurality of storage units, wherein the storage units are sequentially arranged; and
   a control unit, coupled to each of the storage units, and respectively transmitting a control signal to the storage units to control the storage units,
   wherein the RFFT arithmetic module outputs a plurality of single period output data in the RFFT output data, the control unit determines whether the single period output data has the longest storing time in the RFFT output data according to a lifetime analysis, wherein the storing time is a time that the RFFT output data is stored in the storage units, the control unit inputs the single period output data having the longest storing time into a plurality of first storage units of the storage units, and sequentially inputs the single period output data not having the longest storing time into a plurality of second storage units of the storage units, wherein the first storage units are arranged at the last of the storage units, and the second storage units are arranged in front of the first storage units.

10. The signal processing apparatus as claimed in claim 9, wherein an $i^{th}$ second storage unit is coupled to an $(i+N)^{th}$ second storage unit, N is the number of the single period output data, and i is between 1 and a quotient obtained by dividing the number of the second storage units by N, and the control unit outputs one of the RFFT output data in the $i^{th}$ second storage unit in the second storage units to the $(i+N)^{th}$ second storage unit, and respectively inputs the obtained single period output data into a $1^{st}$ second storage unit to an $N^{th}$ second storage unit, and continually stores the RFFT output data of the first storage unit in the first storage unit.

* * * * *